United States Patent [19]

Panoushek et al.

[11] Patent Number: 4,913,004
[45] Date of Patent: Apr. 3, 1990

[54] ELECTRONIC POWERSHIFT CONTROL SYSTEM FOR AN IMPLEMENT TRANSMISSION

[75] Inventors: Dale W. Panoushek, Lemont; Ernest A. Kreitzberg, Willow Springs; Frank F. DiMaggio, Arlington Heights, all of Ill.

[73] Assignee: J. I. Case Company, Racine, Wis.

[21] Appl. No.: 255,643

[22] Filed: Oct. 11, 1988

[51] Int. Cl.$^4$ ............................................. B60K 41/02
[52] U.S. Cl. ....................................... 74/861; 74/335; 364/424.1
[58] Field of Search ...................... 74/861, 866, 752 D, 74/752 A, 335; 364/424.1

[56] References Cited

U.S. PATENT DOCUMENTS

| | | | |
|---|---|---|---|
| 4,041,809 | 8/1977 | Dick et al. | 74/752 D X |
| 4,283,970 | 8/1981 | Vukovich | 74/861 X |
| 4,524,645 | 6/1985 | Tatsumi | 74/861 X |
| 4,527,678 | 7/1985 | Pierce et al. | 74/866 X |
| 4,653,350 | 3/1987 | Downs et al. | 74/866 X |
| 4,665,772 | 5/1987 | Greene | 74/862 |
| 4,707,789 | 11/1987 | Downs et al. | 74/866 X |
| 4,730,519 | 3/1988 | Nakamura et al. | 364/424.1 X |
| 4,742,461 | 5/1988 | Eschrich et al. | 74/861 X |
| 4,791,568 | 12/1988 | Hiramatsu et al. | 74/866 X |
| 4,799,158 | 1/1989 | Patil | 74/866 X |

FOREIGN PATENT DOCUMENTS 61-84446 4/1986 Japan .
62-41460 2/1987 Japan .

*Primary Examiner*—Dwight G. Diehl
*Assistant Examiner*—Chris Campbell
*Attorney, Agent, or Firm*—Dressler, Goldsmith, Shore, Sutker & Milnamow, Ltd.

[57] ABSTRACT

An electronic powershift control system for an implement transmission having a plurality of selectively operated electrically controlled hydraulic powershift clutches. The system includes a manually positionable gear selector connected to electrical control circuitry. The electrical control circuitry receives input shift signals from the gear selector indicative of the shift desired and, in response, produces output shift signals for operating various hydraulic powershift clutches over a predetermined time to effect the desired shift. The electrical circuitry further incorporates a feed back loop which allows the circuitry to monitor shift performance effected during the desired shift and, if necessary, adjust the predetermined time of powershift clutch operation the next time the same shift is selected by the operator.

7 Claims, 3 Drawing Sheets

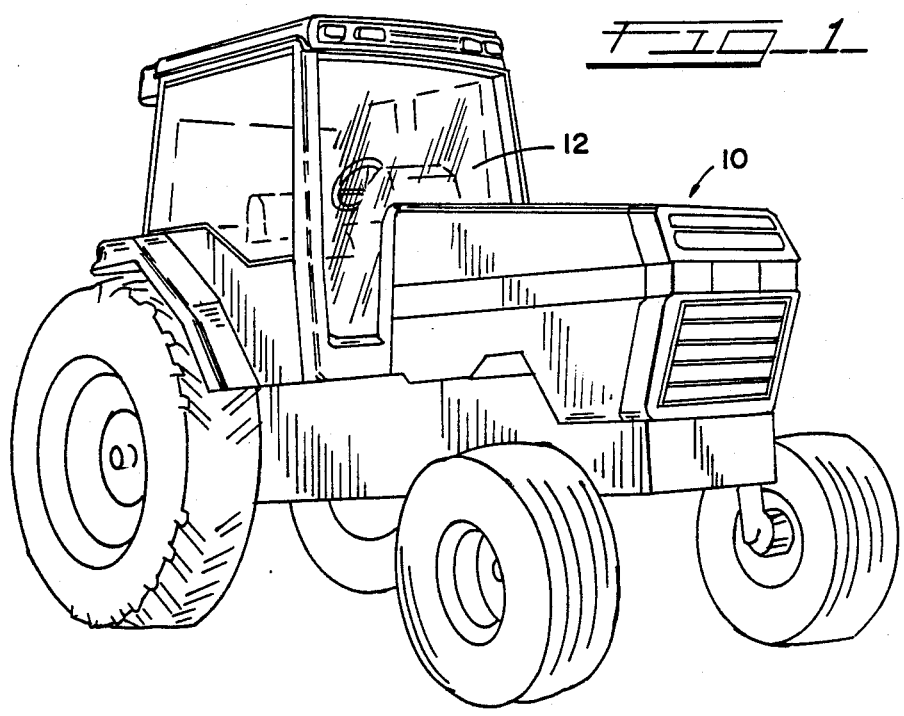
FIG_1
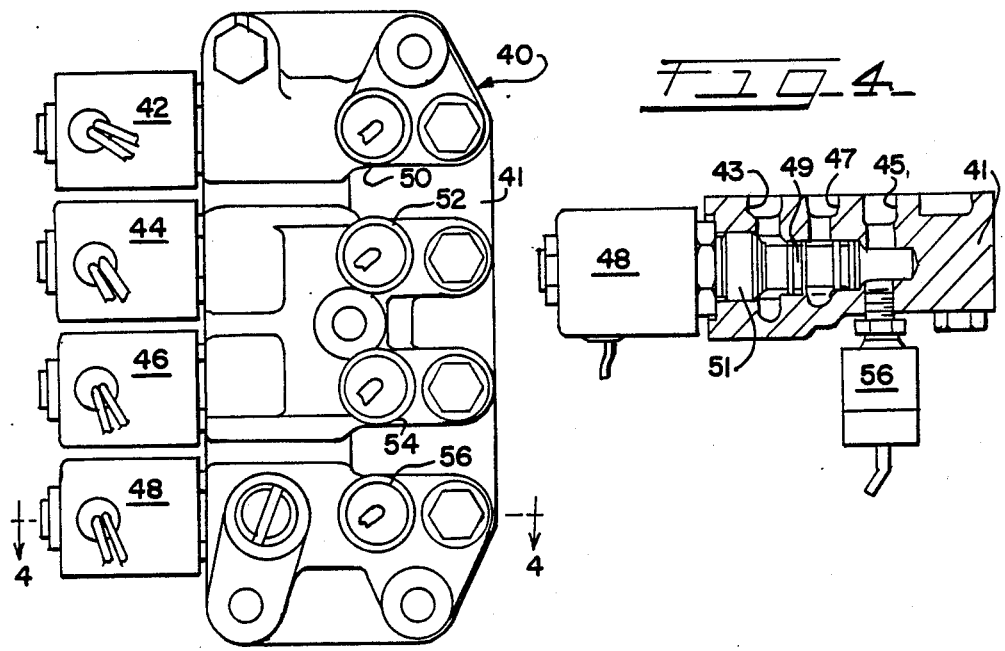
FIG_3
FIG_4

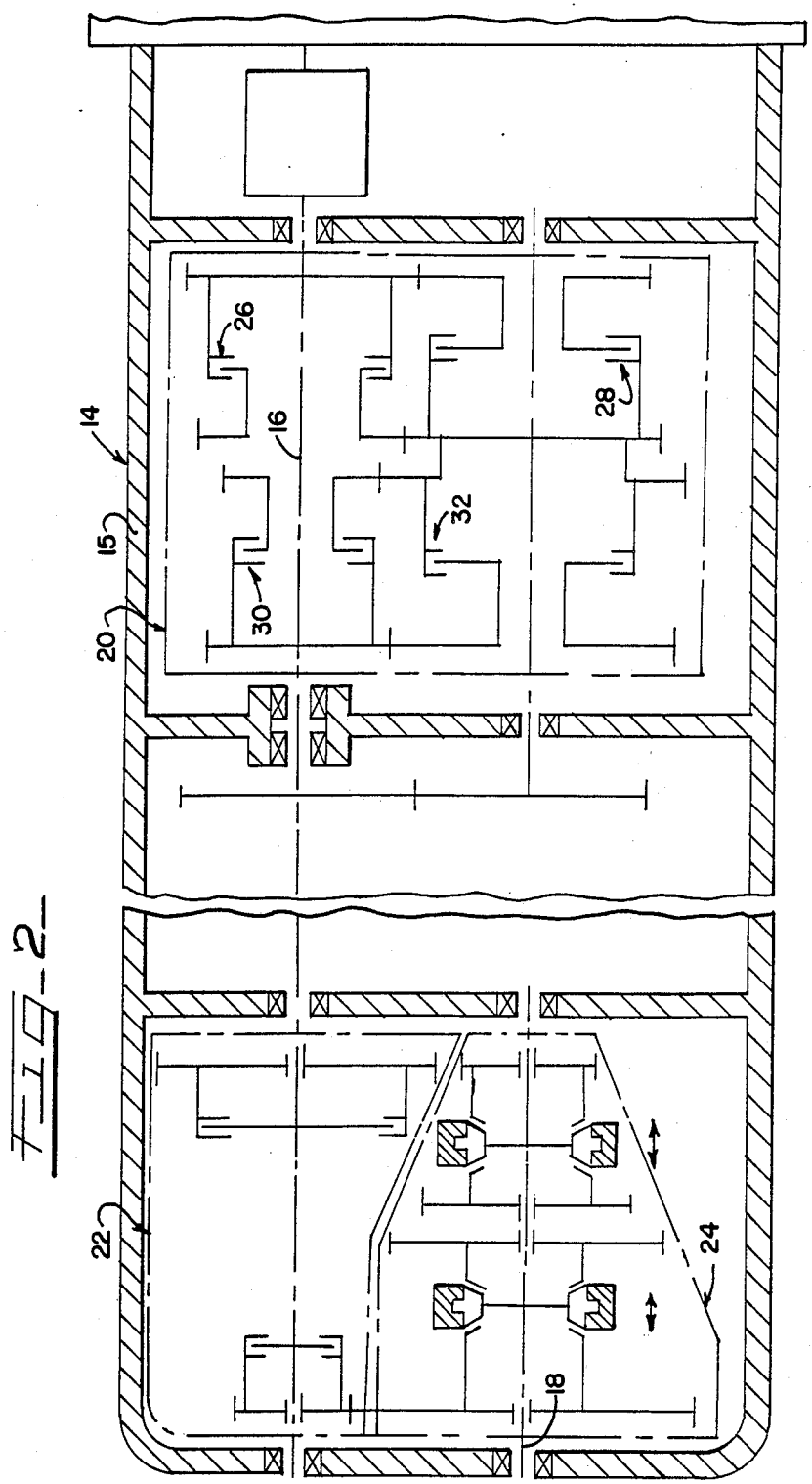

ELECTRONIC POWERSHIFT CONTROL SYSTEM FOR AN IMPLEMENT TRANSMISSION

FIELD OF THE INVENTION

The present invention relates to a control system for an implement transmission having a plurality of electrically controlled hydraulic clutches and, more particularly, to an adaptive powershift control system which monitors previous transmission shift performance and adjusts engagement and disengagement of the hydraulic clutches the next time the same shift occurs thus facilitating smoother shifting.

BACKGROUND OF THE INVENTION

Material handling implements such as tractors, bulldozers, and the like, frequently employ multi-speed powershift transmissions which are shiftable through a plurality of sequenced gear ratios. Gear ratio selection is effected by selective fluid pressurization of hydraulic clutches. In such a transmission, a plurality of powershift hydraulic clutches are typically provided where an engagement of each clutch by fluid pressurization provides a respective one of the transmission's multi-speeds. Electrically or manually controlled hydraulic valves are typically employed for supplying pressurized fluid to the hydraulic clutches.

To reduce operator fatigue, powershift transmissions allow the operator to readily effect a change in gear ratios through manual manipulation of a gear shift lever without disconnecting the power source from the transmission attendant to each change or shift in gear ratio. Instead, powershift transmissions typically include a control system having suitable controls for operating the hydraulic valves to effect shifting of the transmission by sequentially pressurizing one of the transmission's hydraulic clutches (for engagement) while relieving fluid pressure in a previously engaged hydraulic clutch. Naturally, efficient operation of the tractor or other implement is promoted by convenient transmission gear ratio selection.

As will be appreciated by those familiar with the art, it is desirable to provide a transmission which can be operated such that powershifting between gear ratios is effected as smoothly as possible. Such ends may be effected through relatively precise sequential operation of the transmission's hydraulic clutches. Although fluid pressurization and depressurization of the clutches involved in a shift is effected quite quickly, operation of the associated hydraulic valves and full clutch engagement or disengagement does change depending on several variable factors.

Because fluid pressurization of an on-coming hydraulic clutch is not instantaneously effected, control arrangements for such transmissions typically function such that initial fluid pressurization of the on-coming hydraulic clutch commences prior to relief of fluid pressure on the off-going hydraulic clutch. Prior commencement of fluid pressurization for the on-coming clutch is required because of inherent time delays involved in actuating the on-coming clutch. To further complicate the problem, these inherent time delays vary depending upon such factors as: response time of the particular electric valve controlling fluid flow to the on-coming clutch; clutch fill period; fluid pressure fluctuations involved in actuation of the clutch; linear movement of a clutch piston or the like against a resilient force; clutch wear; and, compression of a series of interleaved plates comprising the on-coming clutch.

The time period between initial full engagement of the on-coming clutch and initial disengagement of the off-going clutch is sometimes referred to as a "critical time" period. Preferably, it is during this critical time period that pressure levels of the on-coming and off-going clutches are concurrently modulated such that as the on-coming clutch is going pressurized for full engagement the off-going clutch is being depressurized toward full disengagement.

Minimization of "shift shock" or "jerk" between gear ratios is the desired goal in configuring transmission control systems. Shift shock is a function of the elapsed time between disengagement of the off-going clutch and initial full engagement of the on-coming clutch. As will be appreciated, if the off-going clutch is disengaged too quickly following initial pressurization of the on-coming clutch, both clutches can be momentarily disengaged, When operated under load, the implement will quickly decelerate between gear ratio shifts or changes. As such, when the on-coming clutch, used to effect the desired gear ratio change, is sufficiently pressurized to transfer torque, the implement is accelerated with a significant shift shock if the critical time between clutch operations is too long. On the other hand, if the off-going clutch is disengaged after the on-coming is fully engaged such that the critical time period is too short, both clutches may be momentarily engaged resulting in objectionable noise generation and possible clutch and transmission damage.

In the past, control systems for powershift transmissions engage and disengage the hydraulic clutches at preset timed intervals regardless of shift quality or performance. While such arrangements can perform satisfactorily, these systems fail to quantify shift performance, do not compensate for clutch wear, or hydraulic fluid temperatures, or a myriad of other variables which effect shift quality and performance.

It is, therefore, desirable to provide a control system for a transmission having a plurality of selectively operable hydraulic clutches wherein the control system monitors transmission shift performance for each gear ratio change or transmission shift and thereafter automatically self adjusts the shifting sequence to optimize for smooth and shock free shifting the next time that same shift is effected.

SUMMARY OF THE INVENTION

In view of the above, and in accordance with the present invention, there is provided an adaptive control system for a hydromechanical transmission which facilitates smooth shifting. The control system of the present invention is adaptive in nature in that it "learns" from each transmission shift performance for each gear ratio change or transmission shift and includes a feed back loop which self corrects the transmission shift timing the next time the same shift occurs thus facilitating smooth shifting of the transmission.

More specifically, the present invention is particularly suited for use with a material handling implement having a multiple speed and range transmission. Such transmissions typically include a plurality of selectively operated hydraulic powershift clutches for conditioning the transmission to operate in various gear ratios within each range of the transmission.

Generally stated, the control system of the present invention includes a manually positionable gear selection control mechanism and electrical control circuitry. The electrical control circuitry receives input shift signals from the gear selection control mechanism indicative of the desired shift and, in response, develops output shift signals for controlling fluid flow to various hydraulic powershift clutches. The electrical circuitry further incorporates a feed back loop which allows the circuitry to monitor shift performance effected during the desired gear shift and adjusts shift performance the next time the same shift is selected by the operator.

The gear selection control mechanism selectively provides a plurality of gear selection electrical signals which respectively correspond to operation of various electrically controlled hydraulic clutches of the transmission. The gear selection control mechanism preferably comprises a suitable shift lever or the like provided in a control area of the implement. Such a control mechanism further includes a plurality of suitable electrical switching devices which are selectively operated by the shift lever for providing the gear selection signals.

The electrical control circuitry of the present invention preferably comprises a suitably programmed microprocessor, operatively connected with the gear selection control mechanism and the electrically controlled hydraulic clutches of the implement transmission. The electrical control circuitry effects the desired sequential operation of the hydraulic clutches in response to operator manipulation of the gear selection control mechanism. More specifically, the electrical control circuitry receives gear selection signals from the gear selection control mechanism and, in response thereto, selectively provides output shift signals to the electrically controlled hydraulic clutches for effecting transmission shifting by selectively operating two of the clutches over a predetermined time. As mentioned above, fluid pressurization of the on-coming clutch is normally initiated prior to relief of fluid pressure in the off-going clutch.

The electrical control circuitry is configured to respond to a feedback signal which adjusts the predetermined time between disengagement and engagement of the off-going and on-coming clutches upon subsequent selection of the same desired gear ratio selection. That is, the electrical control circuitry determines whether the critical time interval between operation of the on-coming and off-going hydraulic clutches is such that shift shock is minimized and, if necessary, corrects that critical time upon subsequent selection of the same desired shift thereby facilitating smoother shifting.

To effect such desirable ends, the control system of the present invention includes means for measuring the time elapsed between engagement and disengagement of the on-coming and off-going hydraulic powershift clutches which are operated to effect a desired shift. The measured time is compared against a predetermined optimum shift time and a feedback signal is generated based on shift performance. The time differential, if any, between the measured time and the predetermined optimum shift time then modifies the output shift times of the electric control circuitry upon subsequent selection of the same desired shift. Smooth shifting of the implement's transmission is thus facilitated since sequential clutch operation is automatically adjusted based on previous shift performance.

Because the temperature of the hydraulic fluid used to actuate the clutches influences shift performance, the control system of the present invention may further include a signal generating sensor for monitoring hydraulic fluid temperature. The signal from such a temperature sensor is automatically factored into the output shift signals of the electrical control circuitry by the microprocessor.

When the timing between clutch operations during a particular or desired shift is within an acceptable range, no adjustment is made to the output shift signal of the electrical control circuitry. When the actual shift time exceeds a predetermined optimum shift time (calculated to minimize shift shock), the feedback signal is used to modify the output shift time of the electrical circuitry such that the critical time between operation of the on-coming and off-going clutches is effected in a manner diminishing shift shock to the implement upon subsequent selection of the same desired shift.

Further features and advantages of the present invention will become readily apparent from the following detailed description, appended drawings, and the accompanying claims.

BRIEF DESCRIPTION OF THE DRAWINGS

FIG. 1 is a perspective view of a material handling implement with which the powershift control system of the present invention is suited for use;

FIG. 2 is a diagrammatic, developed, but substantially side elevational view of a multi-speed powershift transmission forming part of the implement illustrated in FIG. 1;

FIG. 3 is an elevational view of a valve assembly comprising part of the electronic powershift control system of the present invention;

FIG. 4 is a partial sectional view taken along line 4—4 of FIG. 3;

DETAILED DESCRIPTION OF A PREFERRED EMBODIMENT

Figure 5:
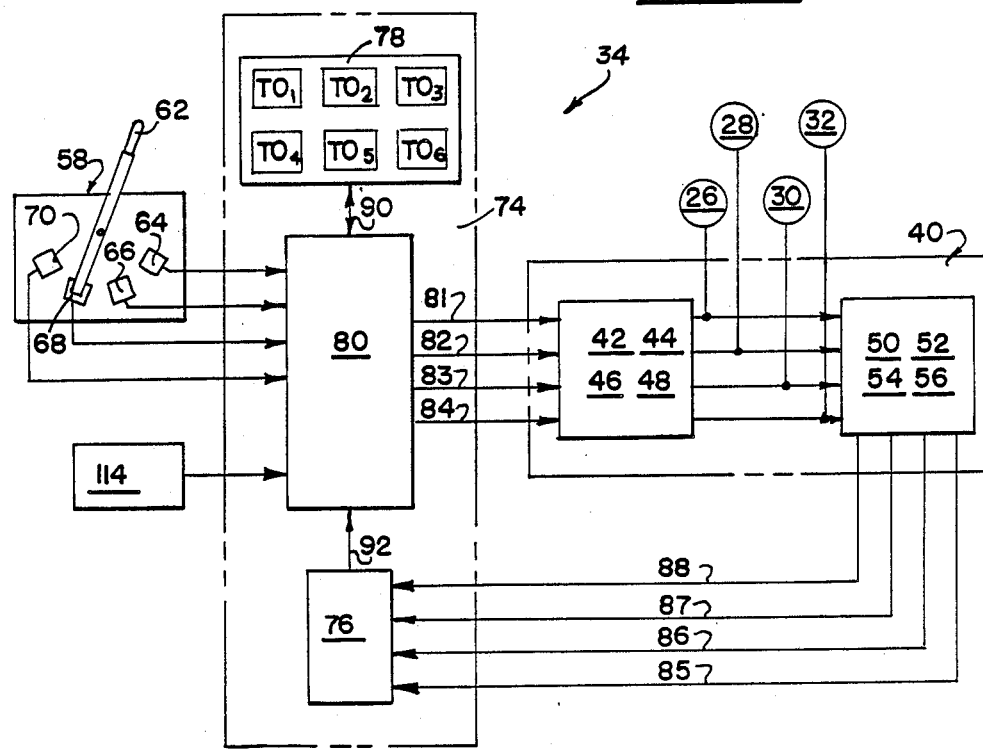
FIG. 5 is a block diagram of an electronic powershift control system constructed in accordance with the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 1, therein is illustrated a off-highway material handling implement 10 such as an agricultural tractor, which is intended as illustrative of the type of implement for which the present shift control system is suited. Implement 10 includes an operator's cab or station 12 wherein various control levers and the like are provided for operating the tractor. One of the components of implement 10 operated from the cab area is a multi-speed transmission, a diagrammatic form of which is illustrated in FIG. 2 and is designated 14. Transmission 14 is likewise intended as a illustrative of the type of transmission for which the present control system is particularly suited.

The specific details of the construction and operation of transmission 14 are well known by those familiar with the art and in and of themselves form no part of the present invention. A basic understanding of the transmission's operation, however, will make clearer the manner in which the present control system effects transmission shifting.

A multi-speed transmission such as 14 typically includes a housing 15 having an input shaft 16 and an output shaft 18 rotatably mounted therein. A speed transmission assembly 20, a direction assembly 22, and a range transmission assembly 24 are operatively interposed between the input shaft 16 and the output shaft 18 to develop multiple and different speed ratios and ranges for the implement. In the illustrated embodiment, four speed ratios are provided for each of four ranges. Therefore, transmission 14 can be conditioned into any of sixteen different gear ratios.

The speed transmission assembly 20 typically includes a plurality of hydraulic clutches, each of which is operatively associated with a respective one of the speeds or gear ratios of the transmission. Thus, transmission 14 is illustrated as including a first speed clutch 26, a second speed clutch 28, a third speed clutch 30 and a fourth speed clutch 32. Engagement of each clutch, and thus selection of its associated gear ratio, is effected by hydraulic fluid pressurization of a particular clutch through a control system 34 (FIG. 5) including a feed back loop.

In the context of a powershift transmission as shown, selective fluid pressurization of the hydraulic clutches is effected by way of a valve assembly 40. Valve assembly 40 includes a valve body 41 which is secured to the transmission 14 and includes four electro-hydraulic valves 42, 44, 46 and 48. Each valve controls fluid pressure flow to one of the clutches in the transmission. Valve assembly 40 further includes four ON/OFF fluid pressure switches 50, 52, 54 and 56 located adjacent the valves 42, 44, 46 and 48 and carried by valve body 41. It will be understood, of course, that if the speed transmission assembly 20 was provided with more than four speed clutches, the valve assembly 40 would likewise be provided with more electro-hydraulic valves and switches than those illustrated.

As best illustrated in FIG. 4, valve body 41 defines an inlet port 43, an outlet port 45, and a sump or exhaust port 47 for each valve and switch combination. Each inlet port 43 is connected to a fluid source of pressure. Each outlet port 45 is connected to one of the speed clutches comprising speed transmission assembly 20. Moreover, each outlet port 45 has one of the ON/OFF pressure switches arranged in fluid communication therewith. Each exhaust port 47 is connected to a sump of the transmission. An extended blind bore 49, defined by valve body 41, fluidically interconnects each port 43, 45 and 47 with the other. As illustrated, each electrohydraulic valve is suitably connected to housing 41 and includes a linearly distendable plunger 51 accommodated within bore 49. As is known, the linear position of plunger 51 controls fluid flow between ports 43, 45 and 47. The linear position of plunger 51 is regulated by the energized state of its associated valve. Actuation and deactuation of pressure switches 50, 52, 54 and 56 in relation to a new speed selected confirms that the shift has occurred.

Shifting of transmission 14 is effected electrically in the sense that selected electro-hydraulic valves of valve assembly 40 are operated attendant to each shift by the powershift control system of the present invention. A preferred form of the powershift control system of the present invention includes an operator positionable gear shifting device 58 connected to electronic control circuitry.

The operator positionable gear shifting device 58 is positioned in the operator's cab 12 of implement 10. Selective positioning of a gear selection lever or a like control effects operation of suitable electrical switch devices associated with the gear selection means.

As illustrated in FIG. 5, the gear shifting device 58 includes a gear selection shift lever 62 which is shiftable to a plurality of different positions. At each position, an electrical gear selection signal is provided respectively corresponding to a desired gear ratio. Accordingly, a first gear selection switch 64, second gear selection switch 66, third gear selection switch 68 and fourth gear selection switch 70 are illustrated as being associated with the shift lever 62 and which correspond to actuation of first speed clutch 26, second speed clutch 28, third speed clutch 30 and fourth speed clutch 32. A range selector lever (not shown) is also arranged within the operator's cab 12 of implement 10 to effect a shift or change in gear ranges for the transmission.

The electronic control circuitry of the present invention includes a control module 74 having analog and/or digital electronic calculation and logic circuitry, preferably microcomputer based, that can take many forms. FIG. 5 illustrates in block diagram the main or primary stages of the control module 74 of the present invention. As illustrated, control module 74 includes measuring stage 76, memory stage 78, and a controller stage 80.

The purpose of controller stage 80 is to develop output shift signals for effecting the desired shift selected by the operator. As illustrated, controller stage 80 is connected to the gear shifting device 58 and to the control valve assembly 40. Controller stage 80 receives input shift signals from the gear shifting device 58 and, in response thereto, produces output shift signals which are delivered over lines 81 thru 84 to the valve assembly 40. As illustrated, a shift signal delivered over any one of the lines 81 through 84 activates one of the valves in the valve assembly in a manner pressurizing one of the powershift speed clutches in the speed transmission assembly. A shift signal delivered over any of the remaining lines leading from controller stage 80 deactivates another one of the valves in the valve assembly in a manner depressurizing an associated powershift speed clutch in the speed transmission assembly. If a problem arises between gear shifts, the controller stage of the control circuitry operates in a safe or neutral mode of operation and alerts the operator in the tractor.

In a preferred form of the invention, the controller stage 80 of control module 74 has a memory stage 78 with a series of separately addressable data base locations T01, T02, T03, T04, T05 and T06. Each of these locations is programmed with a preset shift time. Moreover, each address location contains a distinctive shift time for a desired shift. The controller 80 accesses the appropriate address location in memory stage 78 over line 90 to determine the time for disengagement of the electrically controlled hydraulic clutch to effect the desired shift. That is, the controller stage 80 engages a second preselected hydraulic clutch then disengages a first preselected hydraulic clutch over a predetermined time accessed from the particular address location in memory to effect a desired gear ratio condition for the transmission as determined by the operator, ie., as a function of the movement of shift lever 62.

As an example, address location T01 contains a shift time for a 1/2 up-shift in any gear range. Address location T02 has a shift time for a 1/3 or a 2/3 up-shift in any gear range. Address location T03 contains a shift time for a 1/4, 2/4 or 3/4 up-shift in any gear range. Address location T04 has a shift time for a 4/3 down-shift in any gear range. Address location T05 contains a shift time for a 4/2 or 3/2 gear shift in any gear range. Address location T06 can has a shift time for a 4/1, 3/1 or 2/1 gear shift in any gear range.

The central system 34 uses a closed-loop central technique to promote desired shifting characteristics of the transmission. As will be understood, the pressure switch associated with the on-coming or pressurized powershift speed clutch produces a signal when the fluid pressure directed to that clutch is sufficiently raised to indicate initial full engagement of the on-coming clutch. Similarly, the pressure switch associated with the off-going or depressurized powershift clutch produces a signal when the fluid pressure of the off-going clutch is sufficiently reduced to indicate initial disengagement of the off-going clutch. Such signals are delivered over lines 85 thru 88 and act as inputs to the measuring stage 76 of the control module 74. Measuring stage 76 of the control module 74 produces an output signal reflective of the actual shift time interval between receipt of the on-coming switch signal and receipt of the off-going switch signal.

The output signal of the measuring stage 76 is delivered over line 92 and acts as an input to the controller stage 80. This signal is reflective of the actual shift time interval between sliding off of the off-going powershift clutch and initial full engagement of the on-coming powershift clutch. The controller stage 80 compares the actual shift time from the measuring stage 76 with a predetermined optimum shift time (shift quality). If there is a difference, the address location data for effecting a gear shift over a predetermined time for that shift is modified accordingly. That is, the control system learns from the quality of the last shift and adjusts accordingly so as to facilitate a smoother shift the next time the same shift is effected. Therefore, upon subsequent operation of the same shift, the controller stage 80 will access the appropriate address location in memory stage 78 which has been modified as a function of the shift quality performance of the previous shift.

In a preferred form of the invention, modification of the time interval between actual shift time and the predetermined optimum shift time is divided in half. Alternative modifications could be made without departing from the spirit and broad scope of the present invention.

Figure 6:
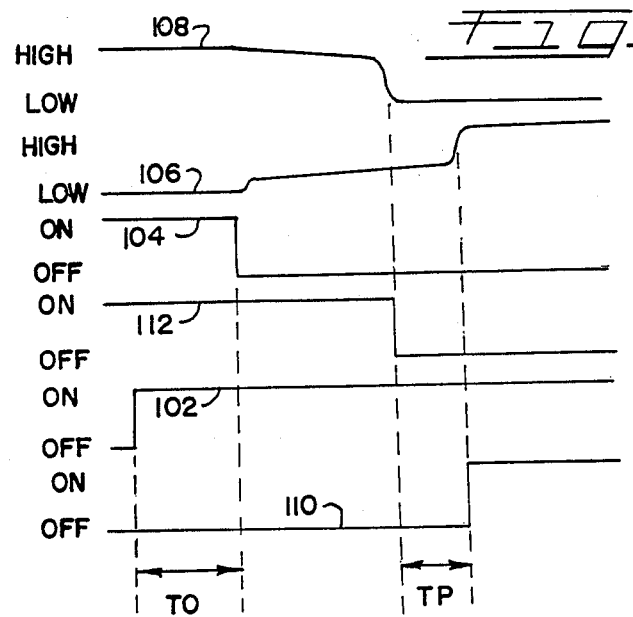
FIG. 6 is a diagrammatic plot graphically illustrating the relationship between valve assembly operation and clutch pressures resulting therefrom.

In operation, shifting of the transmission is effected electrically in the sense that selected ones of the electrohydraulic valves 42, 44, 46 and 48 are operated attendant to each shift. FIG. 6 graphically illustrates the operational relationship between valve assembly 40 with on-coming and off-going clutches.

When the operator signals a gear change through manipulation of the shifter lever 62, a shift signal is delivered to that control valve associated with the on-coming clutch. Line 102 of FIG. 6 schematically represents an energization trace of a control valve associated with an on-coming clutch. Line 104 of FIG. 6 schematically represents an energization trace of a control valve associated with the off going clutch. TO represents the elapsed time difference between energization of the on-coming clutch and de-energization of the off-going clutch.

While operation of the valves and attendant pressurization or depressurization of the hydraulic clutches is effected quite quickly, a time lapse occurs between the time an electrical signal is delivered to a control valve for its operation and the complete and effective engagement or disengagement of a clutch by fluid pressurization or relief of fluid pressure. In this regard, line 106 of FIG. 6 schematically represents a pressure trace of the pressure level associated with the on-coming clutch associated with the desired shift. Line 108 of FIG. 6 schematically represents a pressure trace of the pressure level associated with the off-going clutch. TP represents the elapsed time difference or "critical time" period between effective depressurization of the off-going clutch and initial full engagement of the on-coming clutch.

As noted above, the change in operative effectiveness of the electrically operated hydraulic powershift clutches is monitored by the switches 50, 52, 54 and 56 of the valve assembly 40. Such switches change state upon sensing a predetermined change in the level of pressure acting on or being directed to the powershift clutch associated with a particular switch. Line 110 of FIG. 6 schematically represents an output signal of the switch associated with the on-coming clutch for effecting a desired gear shift. As represented in FIG. 6, such switch changes state when the pressure level directed to the on-coming clutch is sufficiently raised to enable the associated clutch to initially engage and transfer torque. Line 112 of FIG. 6 schematically represents the output signal of the switch associated with the off-going clutch. Similarly, and as is evidenced in FIG. 6, the output signal of the switch associated with the off going clutch changes state upon de-energization of the off going clutch. Again, TP represents the elapsed time between effective actuation of the on-coming clutch and effective deactuation of the off-going clutch as monitored by valve assembly 40. As will be appreciated, times TP and TO are interrelated with each other.

As will be appreciated, the smoothness with which shifting of transmission 14 is effected is directly related to time TP. Although some shift shock is inevitable attendant to shifting, a distinct range exists for which shift shock is at or below an acceptable level. In a preferred embodiment, clutch underlap of about 6±2 milliseconds has been found beneficial in minimizing clutch wear in this particular application. It should be appreciated, however, that another application using this control system may require a different time between clutch disengagement and engagement. When TP time is too great, shift jerk increases substantially as both the on-coming and off going clutches are temporarily without sufficient pressurization to transfer torque in the implement. Particularly if the implement is under load, it decelerates quickly, and then jerks forward as the on-coming clutch finally engages. In contrast, if the TP time is too short, clutch overlap can result in excessive shift shock as the implement tends to jerk forward as the on-coming clutch is brought on. A long negative TP time can eventually result in transmission lock up which can stall the associated engine of the implement.

The present invention contemplates a control system which monitors actual shift time TP for every shift and uses such monitored data to self-correct shift performance the next time that same shift is effected by the transmission. Shift performance is effected through a feed back loop which is used to modify the output shift signals of the control circuitry which effect the desired shift. If TP time is not in the preferred range, TO time at that particular address location used to effect the shift will be modified accordingly the next time that same shift is performed. More particularly, if the shift time TP is too long, for a particular shift the feed back loop modifies the data in the particular address location used to effect the desired shift. On the other hand, if shift time TP is too short, the feed back loop modifies the data in the particular address location used to effect the desired shift. By modifying the address location data in memory stage 78, the output signals the controller generates from that particular address location are modified to improve shift performance the next time that same shift is effected. When the shifting timing between clutch operations during a particular or desired shift are within an acceptable range, no adjustment is made to the output shift signal of the electrical control circuitry. As should be appreciated, TO is a fixed time for hydraulic oil temperatures below about 120° F.

One important variable which can substantially effect the operation of the transmission's hydraulic clutches is the temperature of the hydraulic fluid employed for pressurizing the clutches for selection of the associated gear ratios. Generally speaking, engagement time TP should decrease attendant to an increase in the temperature (and thus a decrease in viscosity) of the hydraulic fluid within the implement transmission. Thus, the present system can further include a temperature sender 114 operatively connected with control module 74 for monitoring the temperature of hydraulic fluid in the transmission 14 and, thereby, modifying the shift time responsively to an increase in the temperature of the transmission hydraulic fluid.

In a preferred form, when the temperature sensed by sensor 114 is less than 32° F. (0° C.) there will be substantially no elapsed time difference between energization of the on-coming clutch and deenergization of the off-going clutch. When a warm (between 32° F. (0° C.) and about 120° F. (49° C.)) temperature is sensed by sensor 114, there will be approximately a 25 millisecond elapsed time difference between energization of the on-coming clutch and deenergization of the off-going clutch. When a hot (greater than 120° F. (49° C.) temperature is sensed by sensor 114, approximately a 25 millisecond time difference will be initially established between energization of the on-coming clutch and deenergization of the off-going clutch but such time may be between 0 and 100 milliseconds. While it will be appreciated that the present system ordinarily optimizes shift performance through the feedback control system, the provision for such a temperature control arrangement further facilitates shift performance and minimizes the magnitude and frequency of adjustments to the shift times.

When the shift lever 62 is moved to effect a multi-step or skip shift pattern or sequence (i.e., a 1/3, 1/4, 2/4, 4/2, 4/1, 3/1) the control system of the present invention does not condition the powershift clutches of the transmission to operate in the interim gear ratios as the shift lever 62 passes therethrough. Instead, such a multi-step or skip shift is performed like an adjacent gear shift. That is, a skip shift uses those address locations associated with an adjacent shift. For example, a 1/3 skip shift uses the same address location in memory stage 78 of the control module 74 as would an adjacent 2/3 up-shift. A 1/4 and 2/4 skip shift uses the same address location in memory stage 78 of the control module 74 associated with an adjacent 3/4 up-shift. A 4/2 skip shift uses that address location in memory stage 78 associated with an adjacent 3/2 down-shift. Moreover, a 4/1 and 3/1 skip shift uses that address location in memory stage 78 associated with an adjacent 2/1 down-shift.

Whether a gear ratio or speed is skipped is determined by the speed the shift lever 62 is moved from one position to another. If the shift lever is moved very rapidly to effect a multi-step or skip shift, the electronic control circuitry will not respond to the interim speed ratio and the desired multi-step or skip shift will be performed like an adjacent shift discussed above. On the other hand, if the operator intends to effect a skip shift but pauses momentarily or slowly moves the shift lever 62 through the interim gear ratio selection, the electronic control circuitry may shift completely between successive gear ratios one gear ratio after the other until the powershift clutches condition the transmission into the gear ratio selected by the operator.

From the foregoing, it will be observed that numerous modifications or variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An electronic powershift control system for off-highway equipment having a manually shiftable transmission with multiple gear ratios in each of a plurality of different ranges, said transmission including an electrically controlled hydraulic clutch associated with a specified gear ratio condition within each range, said control system comprising.

shiftable means for selecting a specified gear ratio condition through movement of a manually shiftable lever as the off-highway equipment is operated, said shiftable means further including means for providing a gear selection signal indicative of the specified gear ratio condition selected for the transmission as through shifting movement of the lever; and control circuitry means operatively connected with said shiftable means and each electrically controlled hydraulic clutch for shifting the transmission from a current gear ratio condition to a specified gear ratio condition only in response to manual movement of said lever, said control circuitry means being configured to receive a gear selection signal from said shiftable means and in response thereto provide outputs to disengage the hydraulic clutch for the current gear ratio condition and engage the hydraulic clutch for the specified gear ratio condition, said control circuitry means effecting disengagement and engagement of the hydraulic clutches over a measurable time period, and wherein said control circuitry means uses a closed-loop control technique which compares the measurable time period between disengagement and engagement of the hydraulic clutches against a reference time period and adjusts said measurable time period in accordance with the comparison by effecting when the hydraulic clutch associated with the current gear ratio condition begins disengaging to improve shift quality in a subsequent shift to said specified gear ratio condition from said current gear ratio condition.

2. An electronic powershift control system according to claim 1 wherein said control circuitry means includes a control module for measuring time elapsed between engagement and disengagement of said hydraulic clutches and to establish said measurable time period, comparing the measurable time period against a reference time period, and subsequently modifying the outputs of said control circuitry means upon subsequent selection of said specified gear ratio condition from said current gear ratio condition.

3. An electronic powershift control system according to claim 1 further including means for sensing temperature of hydraulic fluid in said transmission for said electrically controlled hydraulic clutches, said temperature sensing means providing an input to said control circuitry means, which input is factored into the output of said control circuitry means for disengagement of the hydraulic clutch associated with the current gear ratio condition.

4. An electronic powershift control system for a manually shiftable tractor transmission having multiple gear ratios in each of a plurality of different ranges, said transmission including an electrically controlled hydraulic clutch associated with a specified gear ratio condition within each range, said control system comprising:

shiftable means operable under the influence of an operator for selecting a specified gear ratio condition for the transmission, said shiftable means comprising a manually operated shift lever which is selectively positioned in various gear ratio positions during operation of the tractor to condition the transmission into various gear ratio conditions only in response to movement of said lever, and means for providing a gear selection signal indicative of a desired gear ration condition selected from the transmission as through positioning of the lever in a selected gear ratio position; and control circuitry means connected to said shiftable means and responsive to a gear selection signal provided thereby for shifting the transmission from a current gear ratio condition to a specified gear ratio condition, said control circuitry means generating outputs which control disengagement of the hydraulic clutch associated with the current gear ratio condition and engagement of the hydraulic clutch associated with the specified gear ratio condition, said control circuitry means causing disengagement and engagement of the hydraulic clutch over a measurable time period, and wherein said control circuitry means uses a closed-loop control technique for adaptively correcting the measurable time period between clutch operations by effecting when the hydraulic clutch associated with the current gear ratio condition begins disengagement in response to a comparison of the measurable time period against a reference time period maintained in and subject to change in a data base such that subsequent output signals generated by said control circuitry means are reflective of said comparison to improve shift quality in subsequent shifts between the current gear and specified gear ratio conditions.

5. The electrical powershift control system of claim 4 wherein said control circuitry means includes means for calculating said measurable time period, comparing the measurable time period against a reference time period, and modifying the outputs generated by said control circuitry means used to control actuation and deactuation of those hydraulic clutches required to be controlled to effect shift quality in subsequent shifts between said current gear and specified gear ratio conditions.

6. The electrical powershift control system of claim 5 wherein said calculating means proportionately modifies the outputs generated by said control circuitry means as a function of any difference between measurable time period and said reference time period.

7. The electrical powershift control system according to claim 4 further including means for sensing hydraulic fluid temperature in said transmission for said electrically-operated hydraulic clutches, said temperature sensing means providing an input to said control circuitry means, which input is computed into the outputs which control disengagement of said of the hydraulic clutch associated with the current gear ratio condition.

* * * * *